United States Patent
Chhabra et al.

(10) Patent No.: US 9,910,793 B2
(45) Date of Patent: *Mar. 6, 2018

(54) MEMORY ENCRYPTION ENGINE INTEGRATION

(71) Applicant: INTEL CORPORATION, Santa Clara, CA (US)

(72) Inventors: Siddhartha Chhabra, Hillsboro, OR (US); Uday R. Savagaonkar, Portland, OR (US); Men Long, Beaverton, OR (US); Edgar Borrayo, Zapopan (MX); Alpa T. Narendra Trivedi, Hillsboro, OR (US); Carlos Ornelas, Guadalajara (MX)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/358,976

(22) Filed: Nov. 22, 2016

(65) Prior Publication Data

US 2017/0075822 A1  Mar. 16, 2017

Related U.S. Application Data

(63) Continuation of application No. 14/581,928, filed on Dec. 23, 2014, now Pat. No. 9,524,249.

(51) Int. Cl.
*G06F 21/00* (2013.01)
*G06F 12/14* (2006.01)
*G06F 9/54* (2006.01)
*G06F 13/16* (2006.01)
*G06F 21/72* (2013.01)

(52) U.S. Cl.
CPC .......... *G06F 12/1408* (2013.01); *G06F 9/546* (2013.01); *G06F 13/16* (2013.01); *G06F 13/1605* (2013.01); *G06F 21/72* (2013.01); *G06F 2212/1052* (2013.01); *Y02B 60/1228* (2013.01)

(58) Field of Classification Search
CPC ...... G06F 12/1408; G06F 21/72; G06F 13/16; G06F 13/1605; G06F 9/546; G06F 2212/1052
See application file for complete search history.

(56) References Cited

U.S. PATENT DOCUMENTS

| | | | | |
|---|---|---|---|---|
| 6,181,711 B1 * | 1/2001 | Zhang | .............. | H04N 21/23614 370/468 |
| 6,347,094 B1 * | 2/2002 | Gopalakrishnan | .. | H04L 12/6418 370/464 |
| 6,650,787 B1 * | 11/2003 | Takahashi | ............ | H04N 19/197 375/E7.133 |
| 7,298,698 B1 * | 11/2007 | Callum | ............... | H04L 12/5693 370/231 |

(Continued)

*Primary Examiner* — David Garcia Cervetti
(74) *Attorney, Agent, or Firm* — Lowenstein Sandler LLP

(57) ABSTRACT

Memory encryption engine (MEE) integration technologies are described. A MEE system may include a MEE interface and a MEE core. The MEE interface may receive a data from an arbiter, where the data is selected by the arbiter from data at memory link queues. The MEE interface may adjust a timing rate to send the data to match a timing of a MEE core. The MEE core may be coupled to the MEE interface and may receive the data from the MEE interface.

19 Claims, 12 Drawing Sheets

(56) References Cited

U.S. PATENT DOCUMENTS

| | | | | |
|---|---|---|---|---|
| 8,045,644 B2* | 10/2011 | Yokoyama | H04B 7/0632 | 370/252 |
| 8,411,569 B2* | 4/2013 | Matthews | H04N 21/23424 | 370/232 |
| 8,495,237 B1* | 7/2013 | Bilinski | H04L 65/1083 | 709/224 |
| 8,533,403 B1* | 9/2013 | Law | G06F 13/1605 | 711/105 |
| 8,856,459 B1* | 10/2014 | Biswas | G06F 13/385 | 710/244 |
| 2002/0184489 A1* | 12/2002 | Mraz | H04L 63/0442 | 713/153 |
| 2004/0157560 A1* | 8/2004 | Yamasaki | H04L 1/0003 | 455/63.1 |
| 2005/0060558 A1* | 3/2005 | Hussain | G06F 9/5044 | 713/189 |
| 2005/0076226 A1* | 4/2005 | Boivie | G06F 21/575 | 713/187 |
| 2005/0111472 A1* | 5/2005 | Krischer | H04L 12/4633 | 370/412 |
| 2006/0014522 A1* | 1/2006 | Krischer | H04L 29/06027 | 455/410 |
| 2007/0192090 A1* | 8/2007 | Shahidi | H04L 1/0026 | 704/221 |
| 2010/0205510 A1* | 8/2010 | von der Embse | G06F 17/148 | 714/776 |
| 2011/0080942 A1* | 4/2011 | Nagara | H04L 1/0014 | 375/240.01 |
| 2011/0099204 A1* | 4/2011 | Thaler | G06F 9/5038 | 707/797 |
| 2011/0107057 A1* | 5/2011 | Petolino, Jr. | G06F 12/1027 | 711/207 |
| 2011/0138092 A1* | 6/2011 | Morimoto | G06F 13/362 | 710/244 |
| 2011/0228929 A1* | 9/2011 | Akhavan-Toyserkani | H04K 1/02 | 380/38 |
| 2011/0246720 A1* | 10/2011 | Nakamura | G06F 12/0813 | 711/119 |
| 2011/0258338 A1* | 10/2011 | Vass | H04N 7/148 | 709/233 |
| 2011/0268428 A1* | 11/2011 | Chen | H04L 65/80 | 386/345 |
| 2011/0307604 A1* | 12/2011 | Wakuda | H04L 65/80 | 709/224 |
| 2013/0051456 A1* | 2/2013 | Kitahara | H04N 19/172 | 375/240.02 |
| 2013/0086586 A1* | 4/2013 | Lakshmanamurthy | G06F 15/7864 | 718/100 |
| 2013/0103870 A1* | 4/2013 | Sanzone | G06F 13/1684 | 710/119 |
| 2013/0191600 A1* | 7/2013 | Kuesel | G06F 12/0888 | 711/136 |
| 2013/0238907 A1* | 9/2013 | Debout | G06F 12/1408 | 713/193 |
| 2013/0326233 A1* | 12/2013 | Tolfmans | H04L 9/0894 | 713/189 |
| 2014/0089650 A1* | 3/2014 | Polzin | G06F 12/14 | 713/2 |
| 2014/0089682 A1* | 3/2014 | Gulati | G06F 21/575 | 713/192 |
| 2014/0089712 A1* | 3/2014 | MacHnicki | G06F 1/26 | 713/324 |
| 2014/0112385 A1* | 4/2014 | Van Veldhuisen | H04N 21/2365 | 375/240.02 |
| 2014/0281488 A1* | 9/2014 | Jiang | H04L 63/0471 | 713/153 |
| 2014/0310536 A1* | 10/2014 | Shacham | G06F 21/78 | 713/193 |
| 2015/0046702 A1* | 2/2015 | Paaske | G09C 1/00 | 713/160 |
| 2015/0149735 A1* | 5/2015 | Nale | G11C 29/023 | 711/147 |
| 2015/0154132 A1* | 6/2015 | Tuers | G06F 21/6218 | 710/111 |
| 2015/0163486 A1* | 6/2015 | Li | H04N 19/115 | 375/240.25 |
| 2015/0186295 A1* | 7/2015 | Savagaonkar | G06F 12/1408 | 713/193 |
| 2015/0234756 A1* | 8/2015 | Tuers | G06F 13/28 | 710/308 |
| 2015/0270956 A1* | 9/2015 | Basmov | G06F 21/602 | 713/189 |
| 2015/0293785 A1* | 10/2015 | Murphy | G06F 9/5027 | 718/102 |
| 2015/0317095 A1* | 11/2015 | Voigt | G06F 13/1642 | 709/219 |
| 2015/0347327 A1* | 12/2015 | Blaine | G06F 13/18 | 711/103 |
| 2016/0070914 A1* | 3/2016 | Baentsch | H04L 63/145 | 713/2 |
| 2016/0105236 A1* | 4/2016 | Zhang | H04B 10/25 | 398/152 |
| 2016/0373790 A1* | 12/2016 | Tsukagoshi | H04N 19/70 | |

\* cited by examiner

400

US 9,910,793 B2

MEMORY ENCRYPTION ENGINE INTEGRATION

RELATED APPLICATION

This application is a continuation of U.S. Non-Provisional application Ser. No. 14/581,928, filed Dec. 23, 2014, now U.S. Pat. No. 9,524,249, the entire contents of which are incorporated by this reference.

TECHNICAL FIELD

The present disclosure pertains to computer systems; more specifically, to protection of data stored in the memory of a computer system.

BACKGROUND

Computer systems, such as hardware systems and software systems, that run on computers often have undetected flaws that can be exploited by hardware attacks or software attacks, such as malicious computer programs that are received over the Internet or other communication networks. The attacks can include Trojans, viruses, worms, spyware, and other malware. Many existing computer security systems combat the attacks by attempting to prevent the attacks from compromising any part of a computer system.

Traditional computer security systems provide relatively low assurance protection of the entire software system. Some systems can provide cryptographic mechanisms for encryption, integrity, and replay protection. Memory encryption protects the confidentiality of memory-resident data. Integrity protection prevents an attacker from causing any hidden modifications to the ciphertext (i.e., encrypted data, as opposed to plaintext which is unencrypted data) in memory. Replay protection eliminates any undetected temporal substitution of the ciphertext. In the absence of encryption, integrity, and replay protections, an attacker with physical access to the system can record snapshots of data lines and replay the data lines at a later point in time to modify the data lines and attack the computer system.

DESCRIPTION OF EMBODIMENTS

Memory encryption engine integration technologies are described. A processor includes a processor core and a memory controller coupled between the processor core and main memory. To prevent the hardware attacks or the software attacks from infiltrating selected applications, processors can provide protected regions of memory, e.g. secure enclaves, for the selected applications to run. While traditional computer security systems provide relatively low assurance protection of the entire software system, systems with the protected regions can prevent access by software that does not reside in the protected regions. The protected regions provide relatively high security for the software in the protected regions.

In one example, the protected regions do not attempt to prevent the hardware attacks or the software attacks from compromising parts of the software system outside of the protected regions, but stop the hardware attacks or the software attacks from compromising parts of the software system within the protected regions. Accordingly, if a software system process outside the protected regions becomes compromised, the compromised process may be prevented from compromising software system resources within the protected region. One advantage of the protected regions is to provide confidentiality and integrity for the selected programs to run even in the presence of privileged malware or other rogue software programs running at high privilege levels.

In order to provide complete protection from hardware attacks, the secure enclaves can provide integrity protection and replay-protection. For example, absent integrity protection and replay-protection, an attacker with physical access to the system can record snapshots of enclave cache lines and replay the cache lines at a later point in time to infiltrate the secure enclave. In one example, a secure enclave can use a memory encryption engine (MEE) to provide cryptographic mechanisms for encryption, integrity, and replay protection. In another example, total memory encryption (TME) can be used to encrypt an entire platform memory. In this example, a MEE can be configured to provide inline memory encryption and decryption to enable the encryption of the platform memory, providing protections similar to the TME.

To provide security for different devices the MEE can be integrated into a processor or used in a system on a chip (SoC) system. The processor or SoC may be used in a device that includes, but is not limited to, a desktop computer, a tablet computer, a laptop computer, a netbook, a notebook computer, a personal digital assistant (PDA), a server, a workstation, a cellular telephone, a mobile computing device, a smartphone, a tablet device, an Internet appliance, or any other type of computing device.

Figure 1:
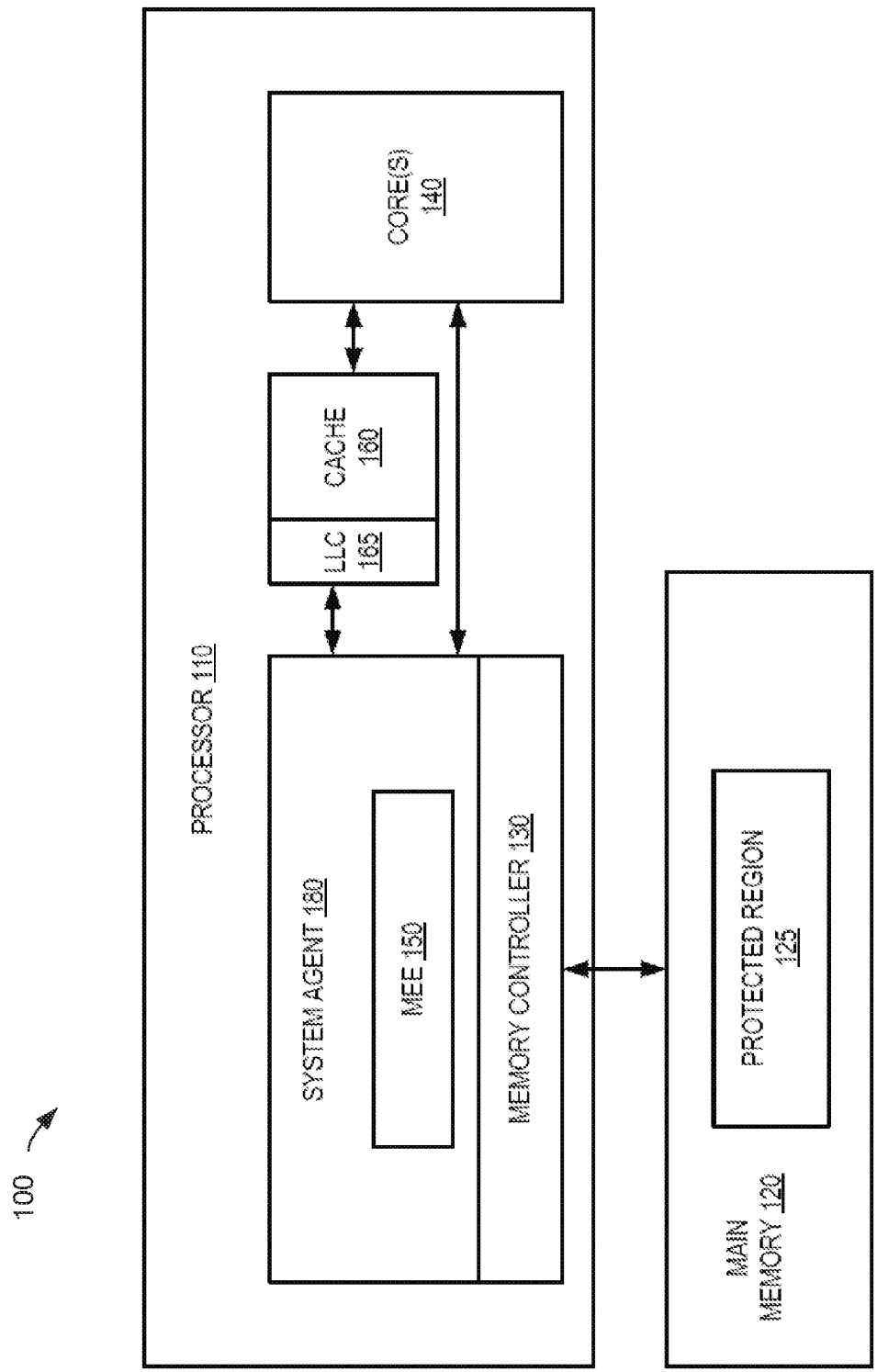
FIG. 1 is a block diagram illustrating a computing system that implements a (memory encryption engine) MEE for implementing secure memory according to one embodiment.

FIG. 1 is a block diagram illustrating a computing system 100 that implements a MEE 150 for implementing secure memory according to one embodiment. The secure memory may be setup at boot time by a basic input-output system (BIOS). The memory protections afforded by the MEE 150 can be transparent to the processor 110, e.g. the processor 110 does not have to execute any instructions for providing confidentiality, integrity and replay protections. For example, when any cache line belonging to a secure page is evicted, the MEE automatically provides confidentiality, integrity and replay protections to that cache line.

The computing system 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, the computing system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

One embodiment may be described in the context of a single processor desktop or server system, but alternative embodiments may be included in a multiprocessor system. Computer system 100 may be an example of a 'hub' system architecture. The computer system 100 includes a processor 110 to process data signals. The processor 110, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 110 is coupled to a processor bus that transmits data signals between the processor 110 and other components in the system 100, such as memory 120 storing instruction, data, or any combination thereof. The other components of the system 100 may include a graphics accelerator, a memory controller hub, an I/O controller hub, a wireless transceiver, a Flash BIOS, a network controller, an audio controller, a serial expansion port, an I/O controller, etc. These elements perform their conventional functions that are well known to those familiar with the art.

In one embodiment, the processor 110 includes a Level 1 (L1) internal cache memory 160. Depending on the architecture, the processor 110 may have a single internal cache or multiple levels of internal caches. Other embodiments include a combination of both internal and external caches depending on the particular implementation and needs. A register file is to store different types of data in various registers including integer registers, floating point registers, vector registers, banked registers, shadow registers, checkpoint registers, status registers, configuration registers, and instruction pointer register.

It should be noted that the execution unit may or may not have a floating point unit. The processor 110, in one embodiment, includes a micro-code (ucode) ROM to store microcode, which when executed, is to perform algorithms for certain macroinstructions or handle complex scenarios. Here, micro-code is potentially updatable to handle logic bugs/fixes for processor 110.

Alternate embodiments of an execution unit may also be used in microcontrollers, embedded processors, graphics devices, DSPs, and other types of logic circuits. System 100 includes a memory 120. Memory 120 includes a dynamic random access memory (DRAM) device, a static random access memory (SRAM) device, flash memory device, or other memory device. Memory 120 stores instructions and/ or data represented by data signals that are to be executed by the processor 110. The processor 110 is coupled to the memory 120 via a processor bus. A system logic chip, such as a memory controller hub (MCH) may be coupled to the processor bus and memory 120. An MCH can provide a high bandwidth memory path to memory 120 for instruction and data storage and for storage of graphics commands, data, and textures. The MCH can be used to direct data signals between the processor 110, memory 120, and other components in the system 100 and to bridge the data signals between processor bus, memory 120, and system I/O, for example. The MCH may be coupled to memory 120 through a memory interface. In some embodiments, the system logic chip can provide a graphics port for coupling to a graphics controller through an Accelerated Graphics Port (AGP) interconnect. The system 100 may also include an I/O controller hub (ICH). The ICH can provide direct connections to some I/O devices via a local I/O bus. The local I/O bus is a high-speed I/O bus for connecting peripherals to the memory 120, chipset, and processor 110. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can include a hard disk drive, a floppy disk drive, a CD-ROM device, a flash memory device, or other mass storage device.

The instructions executed by the processor core 140 described above can be used with a system on a chip. One embodiment of a system on a chip includes a processor and a memory. The memory for one such system is a flash memory. The flash memory can be located on the same die as the processor and other system components. Additionally, other logic blocks such as a memory controller or graphics controller can also be located on a system on a chip.

The processor 110 includes one or more processor cores 140 to execute instructions of the system. The processor core 140 includes, but is not limited to, pre-fetch logic to fetch instructions, decode logic to decode the instructions, execution logic to execute instructions and the like. The processor 110 includes a cache 160 to cache instructions and/or data. The cache 160 includes, but is not limited to, level one, level two, and a last level cache (LLC) 165, or any other configuration of the cache memory within the processor 110. In another embodiment, the computing system 100 includes a component, such as a processor 110 to employ execution units including logic to perform algorithms for processing data, in accordance with the embodiment described herein.

The memory controller 130 performs functions that enable the processor 110 to access and communicate with a main memory 120 that includes a volatile memory and/or a non-volatile memory. In one embodiment, the memory controller 130 is coupled to a system agent 180 that includes a MEE 150 and can communicate data between the MEE 150 and the main memory 120. The system agent 180 can communicate data with at least one of processor core 140, a graphics core, a cache agent 160, a system agent, or a memory agent. In one embodiment, the MEE 150 is located between the last level cache (LLC) 165 and the memory controller 130 to perform encryption, decryption and authentication of the data lines moving in and out of a protected region 125 of the main memory 120. The MEE 150 is located on the processor die, while the memory 120 is located off the processor die.

According to one embodiment of the invention, the MEE 150 processes multiple memory read requests in parallel to improve the access latency to the protected region 125. The MEE 150 performs counter mode encryption which requires the encryption seed to be unique for a data line both temporally and spatially. Spatial uniqueness can be achieved by using the address of the data line to be accessed, while temporal uniqueness can be achieved by using a counter that serves as the version of the data line. In one embodiment, the MEE 150 also protects the data lines in the protected region 125 of the main memory 120 using a counter tree structure in which only the root of the tree is stored on-die and forms the root of trust (i.e., a trust boundary). The versions of the data lines are part of this counter tree structure. Alternatively, other protection mechanisms may be used for replay-protection. For example, Message Authentication Codes (MACs) associated with the secure cache lines can be stored on-die, since a successful replay attack would need to replay both the data line and its associated MAC. However, this solution has prohibitively high on-die storage requirements.

In one embodiment, memory encryption can protect the confidentiality of memory-resident data on the main memory 120. Memory encryption is primarily designed to protect against passive attacks where an attacker tries to silently observe the data lines as the data lines move on and off the processor. Some processors include an encryption module that encrypts sensitive data before the data is stored into a protected region of the memory. On a memory read to the protected region, the data line is decrypted before being fed into the processor. The encryption and decryption algorithms can be chosen based on the security level required by the user.

The main memory 120 can be divided into regions, including one or more protected regions 125 (also referred to herein as secure memory range or MEE region). Each region has multiple sections, an enclave page cache (EPC) section, a hardware reserved section of replay-protection and integrity metadata, and another hardware reserved section which is internal to implementation. In one embodiment, the protected region (MEE region) may be a fixed range or multiple protected regions (MEE regions) may be a set of multiple fixed ranges. In another embodiment, the entire memory could be configured as flexible memory, divided into multiple MEE regions. At startup, the entire memory starts as non-secure and the system software converts it as guided by the demand for secure memory on the system. As described herein, the main memory 120 may include multiple secure MEE regions, and may also include non-secure memory ranges.

Embodiments are not limited to computer systems. Alternative embodiments of the present invention can be used in other devices such as handheld devices and embedded applications. Some examples of handheld devices include cellular phones, Internet Protocol devices, digital cameras, PDAs, and handheld PCs. Embedded applications can include a microcontroller, a digital signal processor (DSP), system on a chip, network computers (NetPC), set-top boxes, network hubs, wide area network (WAN) switches, or any other system that can perform one or more instructions in accordance with at least one embodiment.

The system agent 180 can be connected to the memory controller 130 through multiple memory links. Secure traffic protected by the MEE 150 can flow through any of the memory links in the system. In a multiple memory link design, memory traffic needing cryptographic protection can flow through any of the memory links in the system, i.e. the memory links are connected to the MEE 150. A single memory link can carry 1/n of the total memory traffic of the system, where n can be the total number of memory links in the system. In one scheme, to provide protection for the memory traffic, the MEE can be replicated for each of the memory links (e.g. MEE slices) to provide MEE protection for the data traffic along the memory links. The MEE can be sized down to MEE slices can be sized down to serve a single memory link in the system and a common cache or other system resources can be used across multiple MEE slices for data logic. However, the sizing down of MEE into MEE slices is done for data logic of the system. Control logic remains unchanged for a sized-down MEE slice design as compared to a full MEE design, e.g. the control logic and control structure does not scale with the sizing down of the MEE into slices and can use a MEE for each memory link. Accordingly, for control logic, a single MEE can be used for memory link. The use of one MEE per memory link can cause significant area overhead and system size, increased power consumption, and reduced battery life for a device.

Aspects of the present disclosure address the above-noted deficiency of using a single MEE per memory link by sharing the MEE between multiple memory links. One advantage of sharing the MEE between multiple memory links can be to enable an area efficient integration (e.g. a reduction in area overhead) of the MEE or a similar cryptographic unit (e.g. TME using a MEE) for SoCs or processors. Another advantage of sharing the MEE between multiple memory links can be to increase power efficiency for an integrated MEE and reduce power consumption by the MEE.

Figure 2:
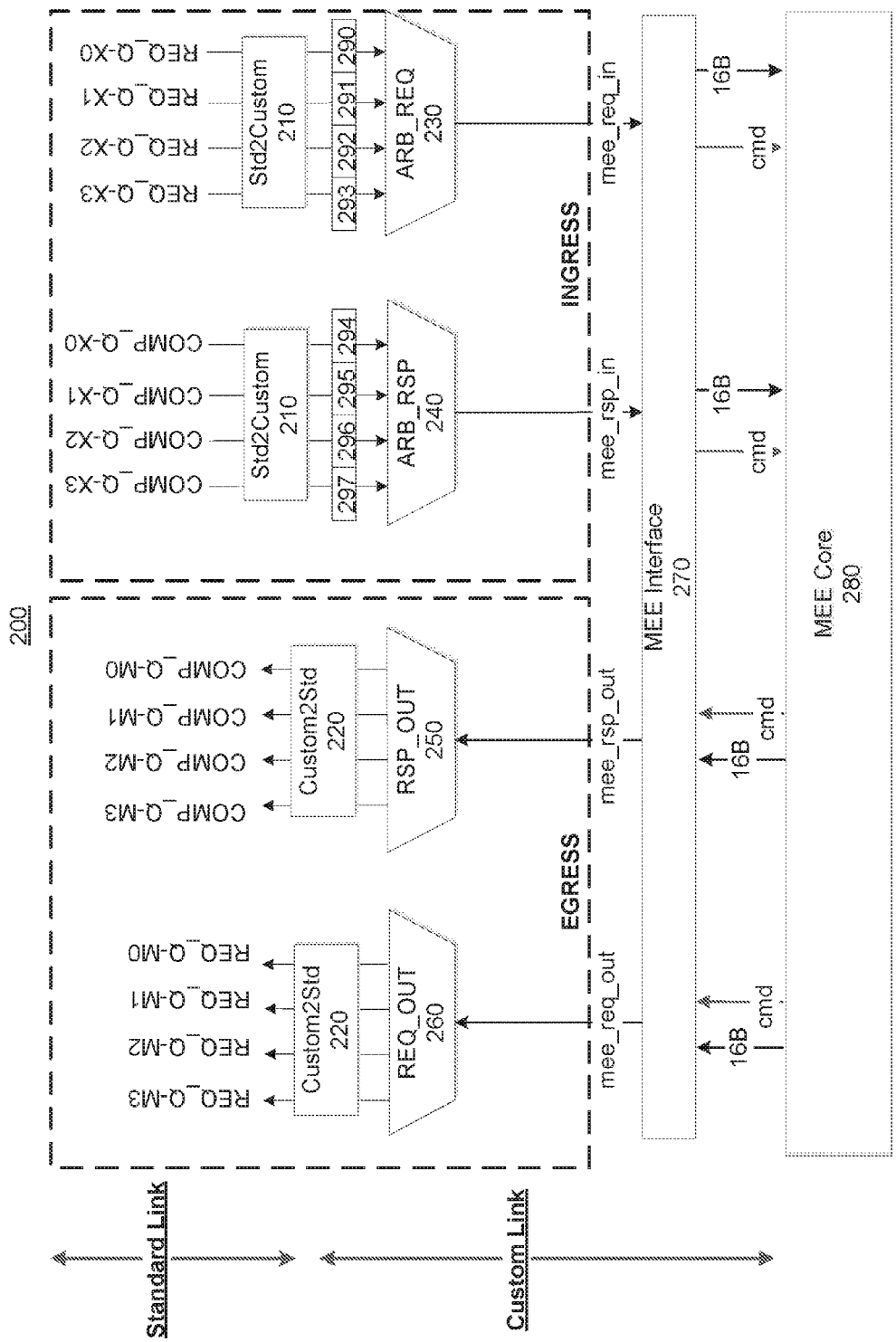
FIG. 2 illustrates a shared MEE system that shares an MEE for multiple memory links according to one embodiment.

FIG. 2 illustrates a shared MEE system 200 that shares a MEE for multiple memory links. FIG. 2 further illustrates that the MEE system 200 can include communication interfaces 210 and 220, arbitrators 230-240, routers 250-260, a MEE interface 270, and a MEE core 280. In the shared MEE architecture 200, the MEE core 280 can be shared between multiple memory links. In one example, the memory links can be in going memory links. In another example, the memory links can be outgoing memory links. In another example, the memory links can be a combination of ingoing and outgoing memory links.

Typically, multiple memory links connected to a single interface, such as a MEE, can increase wire pressure on a MEE system and can cause wire routing concerns and increase MEE system area overhead to accommodate all the memory interface wires. The communication interfaces 210 and 220 of the shared MEE system 200 can be used for communication with the MEE core 280, such as communicating data between a system agent or memory controller and the MEE core 280. The communication interfaces 210 and 220 carries signals to and from the MEE core 280 from the memory link lines on an on-demand basis. One advantage of using the communication interfaces 210 and 220 to communicate with the MEE can be to reduce the wire pressure. Another advantage of using the communication interfaces 210 and 220 to communicate with the MEE can be to ease wire routing requirements of the memory links in the MEE architecture 200.

The communications interface 210 can be a standard to custom (Std2Custom) interface 210 that translates requests and responses to the MEE core 280 from a standard memory format of a system agent or a memory controller to a custom memory format for the MEE core 280. The Std2Custom interface 210 can perform translation on an ingress path to the shared MEE core 280. In one example, the requests on the ingress path to the shared MEE core 280 can be requests sent from a system agent to the MEE core 280. For example, the Std2Custom interface 210 can receive requests from a system agent on memory links REQ_Q-XN (where N is a number of a memory link) sent to the MEE core 280. In another example, the responses on the ingress path to the shared MEE core 280 can be responses sent from a memory control to the MEE core 280 (e.g. a path along a COMP-Q_X memory link). For example, the Std2Custom interface 210 can receive responses for the MEE core 280 from a memory control on memory links COMP_Q-XN (where N is a number of a memory link).

The communications interface 220 can be a custom to standard (Custom2Std) interface 220 that translates requests and responses of the MEE core 280 from the custom memory format of the MEE core 280 to the standard memory format for the system agent or the memory controller. In one example, the Custom2Std interface 220 can perform translation on an egress path from the shared MEE core 280. The requests on the egress path from the shared MEE core 280 can be requests sent to a system agent from the MEE core 280. For example, the Custom2Std interface 220 can send requests to a memory controller on memory links REQ_Q-MN (where N is a number of a memory link) from the MEE core 280. In one example, the requests can be data requests generated by the MEE. In another example, the requests can be metadata requests generated by the MEE.

The Custom2Std interface 220 can perform translation on an egress path from the shared MEE core 280 to the system agent. For example, the Custom2Std interface 220 can send responses to the system agent on memory links COMP_Q-MN (where N is a number of a memory link) from the MEE. FIG. 2 illustrates a four memory link configuration. The four memory link configuration is an exemplary example of the MEE architecture for sharing the MEE and the MEE architecture can be applied to other configurations.

The responses and requests can be stored in queues 290-293, 294-297, 298, and/or 299, respectively before being communicated between the MEE core 280 and the system agent or memory controller. The requests can be stored in queues 290-293 until the requests are selected by the ARB_REQ 230 to be sent to the MEE core 280. The responses can be stored in queues 294-297 until the responses are selected by the ARB_RSP 240 to be sent to the MEE core 280. In one example, when a read request is selected by ARB_RSP 240 and sent to the MEE core 280, space can be reserved for the response to be sent from the MEE along memory links COMP_Q-MN. When space reservation may not be reserved, the read request can be held at the queues 294-297. In another example, the responses can be stored in queue 298 until the requests are selected by the RSP_OUT 250 to be sent to the system agent.

In one example, memory links REQ_Q_MN can be configured to manage pending requests from the MEE core 280, e.g. the number of requests sent to the MEE core 280 from the memory links REQ_Q-XN. In another example, the requests can be stored in queue 299 until the requests are selected by the REQ_OUT 260 to be sent to the memory controller. Memory links REQ_Q-MN and COMP_Q-M1 and queues 298-299 can be on an egress path from the MEE core 280 while Memory links REQ_X-MN and COMP_X-M1 and queues 290-293 and 294-297 can be on an ingress path into the MEE core 280.

The arbiters 230-240 and/or routers 250-260 can be used to select when the requests and/or responses can be sent from a memory controller or a system agent to the MEE core 280 along a memory link and/or from sent from the MEE core 280 to the memory controller or the system agent. Arbiter 230 can be a memory request arbiter (ARB_REQ). The MEE core 280 can receive MEE requests to access secure memory in an enclave. The MEE request can originate from the system agent over the REQ_Q-XN memory links. The ARB_REQ 230 can arbitrate between the REQ_Q-XN memory links and select one of the contending REQ_Q-XN memory links to send the MEE request to the MEE core 280 during an arbitration cycle. The MEE requests over the REQ_Q-XN memory links can be buffered in request queues 290-293, respectively, until the ARB_REQ 230 selects the buffered MEE request to send to the MEE core 280.

In one example, the ARB_REQ can select the MEE requests from the request queues 290-293 in a random order. In another example, the ARB_REQ can select the MEE requests from the request queues 290-293 using a round-robin selection scheme. For example, FIG. 2 illustrates ARB_REQ 230 with four memory links REQ_Q-X1-4. In this example, each memory link REQ_Q-X1-4 may contend for selection of a request by the arbiter in multiple arbitration cycles. When the ARB_REQ 230 uses the round-robin algorithm, a request from the queue 290 of memory link REQ_Q-X1 can be selected in a first arbitration cycle, a request from the queue 291 of memory link REQ_Q-X2 can be selected in a second arbitration cycle, a request from the queue 292 of memory link REQ_Q-X3 can be selected in a third arbitration cycle, a request from the queue 293 of memory link REQ_Q-X4 can be selected in a fourth arbitration cycle. In this example, the sequence of selecting the memory links REQ_Q-X1-4 can be repeated when the queues 290-293 of the memory links REQ_Q-X1-4 continue to contend in subsequent arbitration cycles. In another example, when one or more of the queues 290-293 does not have a request or a response in the queues 290-293 (e.g. the one or more of the queues 290-293 are empty) the queues 290-293 can be skipped in the round-robin selection scheme while the queues 290-293 are empty. For example, when memory link REQ_Q-X1 does not have a request or response in the queue 291, then queue 291 may be skipped in the round-robin selection scheme.

Arbiters 230 and 240 and/or routers 250 and 260 can be initialized prior to using a round-robin selection scheme for selection of requests and responses from queues 290-299, respectively. In one example, the arbiters 230 and 240 and/or the routers 250 and 260 can initialize link order variables (LINK_ORDER[0-N−1]), link contending variables (LINK_ CONTENDING [0-N−1]), and an arbitration selection variable (ARB WINNER) prior to using the round-robin selection scheme. The LINK_ORDER [0 . . . N−1] variables can indicate a link order associated with the queues connected to the arbiter. The LINK_ORDER [0 . . . N−1] variables can indicate an order that the queues of the memory links can be selected. For example, contending memory links can be assigned link order numbers ranging from 0 to N−1, where N is the total number of contending memory links. In this example, the contending memory link with the lowest link order number can be selected by the arbiter first in the round-robin selection scheme. The LINK_ CONTENDING[0 . . . N−1] can indicate when a link is contending in a current arbitration cycle. In one example, when the LINK_CONTENDING variable is set to 1 for a queue of a memory link, the queue of the memory link may be contending for selection by the arbiter. In another example, when the LINK_CONTENDING variable is set to 0 the memory link may not be contending for selection by the arbiter. The ARB_WINNER variable can indicate which queue of the memory link has been selected during a current arbitration cycle.

In one example, the ARB_REQ 230 can receive a signal (such as a one bit signal) as an input from the queues 290-293 indicating whether the queues 290-293 contain requests and are contending in a current arbitration cycle for selection to send the request to the MEE core 280. In another example, for the queues 290-293, the ARB_REQ 230 can receive an assertion message, where the assertion message indicates whether the queue 290-293 is active or inactive. Similarly, ARB_RSP 240 can receive assertion messages indicating queues 293-297 are contending during a current arbitration cycle.

For each arbitration cycle, the ARB_REQ 230 or ARB_RSP 240 can select a queue of a memory link to send a request or response to the MEE core 280. In one example, the queue of the memory link with the lowest link order can be picked as the queue to communicate the request or response to the MEE core 280. In another example, when a memory link has been selected for a current arbitration cycle, the link order associated with each memory link can be decremented by 1, e.g. moving each memory link up in the link order for selection by the arbiter. In this example, the currently selected memory link can be reset to the highest memory link number (NUM_LINKS-1), e.g. the selected link order is moved to an end of the order after the selection of the link by ARB_REQ 230 or ARB_RSP 240.

One advantage of selecting the memory links in a round-robin order can be to enable each of the memory links to be selected equally. Another advantage of using the round-robin selection scheme to select the memory links can be to maintain an order of the requests and responses as they are received at the queues. Another advantage of using the round-robin selection scheme can be to enable each memory link to remain in the order of selection when the queue of the memory link is empty during previous arbitration cycles. For example, queue 293 can be at link order 4 (e.g. fourth in line for selection) with an empty queue during arbitration cycles 1-2. Queue 293 can then receive a request during arbitration cycle 3 (having decremented to link order 2), as the link order for queue 293 is maintained during the arbitration cycle. When queue 293 reaches link order 1 at the next arbitration cycle the request at queue 293 can be selected to be sent to MEE core 280. In this example, the queue 293 for the memory link REQ_Q-X3 will maintain its order in the round-robin selection scheme even though the queue 293 was empty for previous arbitration cycles.

The arbiters 230 and 240 can use selection criteria in determining when to select a queue of a memory link to send a response or a request to a MEE core 280. The selection criteria can include types of the request for the MEE core 280. In one example, contending queues can indicate a type of request for the MEE core 280. In this example, when a message is sent to an arbiter indicating the queue has a request for consideration for selection in the round-robin selection scheme, the message can also indicate the type of request that will be forwarded to the MEE if the queue is selected.

Queue 290 of REQ_Q-X0 can include a request for data (such as a read request) to be sent to the MEE core 280. In this example, ARB_REQ 230 can determine when the MEE core 280 responds to the request for data. In one example, the MEE core 280 sends the response to the completion queue 298 when the completion queue has space available (e.g. capacity) to hold the read data response in the completion queue 298. In another example, the ARB_REQ 230 holds the requests until space can be reserved for the response to be sent from the MEE along memory links COMP_Q-MN.

ARB_REQ 230 can use a counter to track an amount of space available (e.g. capacity) in memory links COMP_Q-MN and/or queue 298. In another example, the space can be tracked at the granularity of a standard memory interface data width, such as 32 bytes (32 B). For example, ARB_REQ 230 can initialize space counters to the size of the four memory links, COMP-Q_M1-4.

As the ARB_REQ 230 tracks an available capacity of a memory links COMP_Q-MN or queue 298, when a quest queue 290-293 has a read request to send, a corresponding availability indicator can be set when a completion queue has available space. For example, a LINK_CONTENDING vector for queues 290-293, respectively, can be set when the space available counters indicate that there is space available for the read data response. In one example, a LINK_CONTENDING bit vector can be obtained as follows: For (i=0; i<NUM_LINKS i++) {LINK_CONTENDING[i]=REQUEST_AVAIL[i] && ((CMD[i]==READ)? (SPACE_AVAILABLE[i]>=2):1)}

The REQUEST_AVAIL is a bit vector where each bit of the bit vector corresponds to the queue of memory links and indicates when the corresponding queue contains a request to send to the MEE core 280. The CMD is a bit vector where each bit in the bit vector indicates that a command will be sent to the MEE when the corresponding queue is selected by the arbiter. The SPACE_AVAILABLE array holds the space available counters for each of the memory links COMP_Q-M. The LINK_CONTENDING is a bit vector used by the ARB_REQ 230 to select the queue 290-293 to send a request to the MEE core 280. When a queue is selected to send a request (such as a read request), the SPACE_AVAILABLE counter for the corresponding queue can be decremented. In one example, when a SPACE_AVAILABLE counter of queue 292 that corresponds to the COMP-Q_M2 memory link is selected, the SPACE_AVAILABLE counter for COMP-Q_M2 can be decremented. In another example, the SPACE_AVAILABLE counter can be decrement by 2, where the MEE core 280 operates at a 64 B granularity and the read requests to the MEE may be 64 B in length using 2 entries in the corresponding completion queue to store the read data response when a standard memory interface data granularity of 32 B is used.

When the MEE core 280 is ready to receive a signal from a memory link, the MEE can send a new request message to ARB_REQ 230 indicating that the MEE core 280 is ready to accept the new request in that arbitration cycle. In one example, the new request message can be sent to ARB_REQ 230 indicating that ARB_REQ 230 can select a new request from queues 290-293. In another example, the new request message can indicate to cease sending requests to the MEE core 280 (e.g. de-assert or deactivate the arbiter).

The MEE core 280 can receive responses from the memory controller on any of the four memory links COMP_Q-XN. The shared MEE system 200 can include a response arbiter 240 (ARB_RSP) to arbitrate or select between the four memory links COMP_Q-XN and select one of the contending memory links to send a response to the MEE core 280 during an arbitration cycle. The responses from the memory controller over the four memory links COMP_Q-XN can be buffered in response queues, 294-297. The ARB_RSP 240 can use the same round-robin algorithm as previously discussed for ARB_REQ 230 to select a competing memory link COMP_Q-XN to send a response to the MEE core 280. The LINK_CONTENDING bit vector for the round-robin algorithm used by ARB_RSP 240 can be a function of whether a response is available in a corresponding completion queue 294-297 and can be obtained as follows: LINK_CONTENDING[i]=RESPONSE_AVAIL[i], where i is a number for memory links COMP_Q-X1-4. In one example, the memory controller responses to the MEE core 280 can be guaranteed to be accepted by the MEE core 280 and the ARB_RSP 240 does not use an assertion message. In another example, the memory controller responses to the MEE core 280 may not be guaranteed and an assertion message can be used as discussed in the preceding paragraphs.

The shared MEE system 200 can include a request out router 260 (REQ_OUT) to select when a request can be routed via one of the memory links REQ_Q-MN to a system agent. In one example, the requests can be routed to the system agent on data lines and/or metadata lines. In one example of a two-slice configuration (e.g. two 32 B slices for a 64 B configuration), each slice can include two memory links. For example, a first slice can use memory links REQ_Q-M0 or REQ_Q-M1 and a second slice can use memory links REQ_Q-M2 or REQ_Q-M3. In this example link or slice hashing can be used to select which of the two memory links may be used for the slices. A system agent can define the hash functions in view of a system performance. In one example, when the system agent selects slice hashing, a mask specified in a configuration register can be applied to address bits and the resulting bits can be XOR'ed together for a final hash result. In another example, when the system agent selects memory link hashing, a mask specified in a configuration register can be applied to address bits and the resulting bits are XOR'ed together for the final link hash result. In another example, the MEE core 280 can implement use a hashing function with the configuration registers mirrored from the system agent.

The shared MEE system 200 can include a response out router 250 (RSP_OUT) to select when a response can be routed via one of the memory links COMP_Q-MN to a system agent or a memory controller. Similar to the requests from the REQ_OUT 260 discussed in the preceding paragraphs, the responses (such as decrypted data) from the MEE core 280 can be routed to a memory link of a slice. When a response is not associated with an address, the MEE core 280 cannot directly implement logic to route the responses. In one example, the MEE core 280 can use routing information from a response tag (e.g. message information received in a request message on memory links REQ_Q-XN). For example, a request tag to the MEE core 280 can include re-purposed bits in the tag to be used for slice and link selection. In another example, the MEE core 280 can maintain a mapping of the request tags to the slice and memory link over which the request was obtained (e.g. the response can be sent over the same slice and link as a request was received).

The shared MEE system 200 can include a MEE interface 270 (such as a MEE shim layer interface) to adjust for timing difference between the MEE core 280 and the communication interfaces 210 and 220. For example, a Std2Custom 210 can receive requests or responses on a first timing rate and the MEE core 280 is to receive requests or responses on a second timing rate. In this example, the MEE interface 270 can adjust the timing rate for the requests or responses at the first timing rate to match the timing rate of the MEE core 280. In one example, the MEE interface 270 can communicate command information using a first communication line and data using a second communication line. In another example, the command information and the data can be sent over the same communication line.

While preceding paragraphs provide an exemplary example of using the architecture 200 for a MEE architecture, the architecture 200 can be used for other functional units which are shared between memory links.

Figure 3:
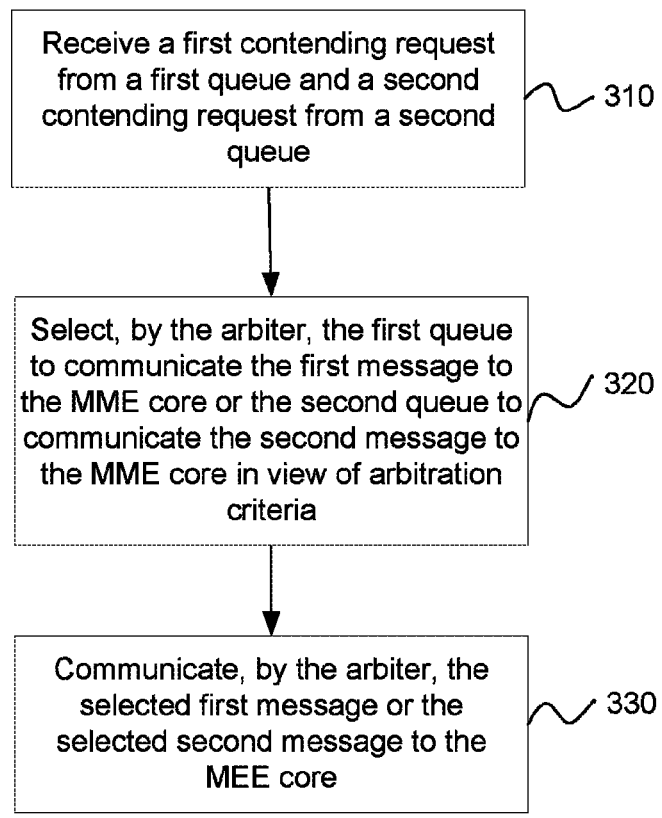
FIG. 3 is a flow diagram of a functionality of processor communicating a message in a MEE system according to one embodiment.
Figure 6:
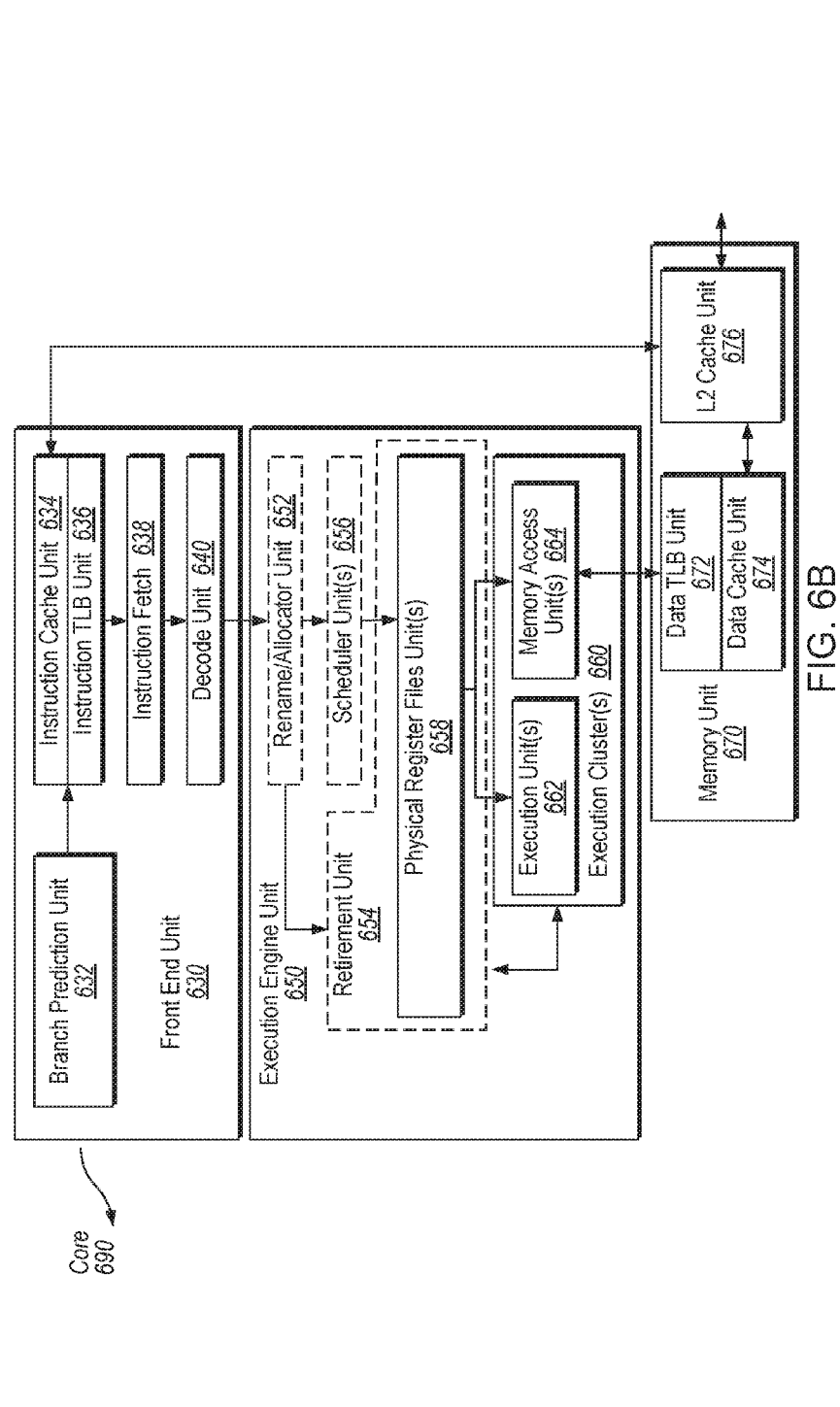
FIG. 6A is a block diagram illustrating an in-order pipeline and a register renaming stage, out-of-order issue/execution pipeline according to one embodiment.
FIG. 6B is a block diagram illustrating a micro-architecture for a processor that implements secure memory repartitioning according to one embodiment.

FIG. 3 is a flow diagram of a functionality 300 of arbiter communicating a message to a MEE according to one embodiment. Functionality 300 may be performed by processing logic that may comprise hardware (e.g., circuitry, dedicated logic, programmable logic, micro-code, etc.), software (such as instructions running on the processor), firmware or a combination thereof. In one embodiment, the processor 110 of FIG. 1 performs the functionality 300. Alternatively, other components of the computing system 100 of FIG. 1 may perform some or all of the functionality 300. In another embodiment, the processor 600 of FIG. 6A or 6B performs the functionality 300. In another embodiment, the processor 700 of FIG. 7 performs the functionality 300. In another embodiment, the processors 870 and/or 880 of FIG. 8 perform the functionality 300. In another embodiment, the processors 970 and/or 980 of FIG. 9 perform the functionality 300. In another embodiment, the one or more of the cores 1002 of FIG. 10 performs the functionality 300. In another embodiment, the cores 1106 and/or 1107 of FIG. 11 performs the functionality 300. In another embodiment, the processing device 1202 of FIG. 12 performs the functionality 300. Alternatively, other components of the computing systems of FIG. 1 and/or FIGS. 6-12 may perform some or all of the operations of the functionality 300.

Referring to FIG. 3, the functionality 300 begins by an arbiter receiving a first contending request from a first queue and a second contending request from a second queue (block 310). The first contending request can be a first request to communicate a first message to an MME. The second contending request can be a second request to communicate a second message to the MEE. The arbiter can select the first queue to communicate the first message to the MEE or the second queue to communicate the second message to the MEE in view of arbitration criteria (block 320). The arbiter can communicate the selected first message or the selected second message to the MEE (block 330).

Figure 4:
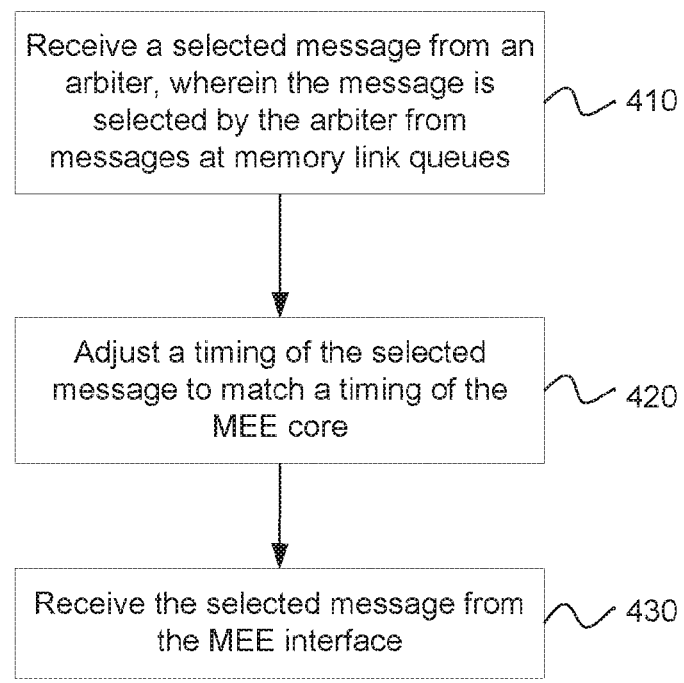
FIG. 4 is a flow diagram of a functionality of processor communicating a message to a MEE according to one embodiment.

FIG. 4 is a flow diagram of a functionality 400 of processor communicating a message to a MEE according to one embodiment. Functionality 400 may be performed by processing logic that may comprise hardware (e.g., circuitry, dedicated logic, programmable logic, micro-code, etc.), software (such as instructions running on the processor), firmware or a combination thereof. In one embodiment, the processor 110 of FIG. 1 performs the functionality 400. Alternatively, other components of the computing system 100 of FIG. 1 may perform some or all of the functionality 400. In another embodiment, the processor 600 of FIG. 6A or 6B performs the functionality 400. In another embodiment, the processor 700 of FIG. 7 performs the functionality 400. In another embodiment, the processors 870 and/or 880 of FIG. 8 perform the functionality 400. In another embodiment, the processors 970 and/or 980 of FIG. 9 perform the functionality 400. In another embodiment, the one or more of the cores 1002 of FIG. 10 performs the functionality 400. In another embodiment, the cores 1106 and/or 1107 of FIG. 11 performs the functionality 400. In another embodiment, the processing device 1202 of FIG. 12 performs the functionality 400. Alternatively, other components of the computing systems of FIG. 1 and/or FIGS. 6-12 may perform some or all of the operations of the functionality 400.

Referring to FIG. 4, the functionality 400 begins by a MEE interface receiving a selected message from an arbiter, where the message is selected by the arbiter from messages at memory link queues (block 410). The MEE interface adjusts a timing of the selected message to match a timing of the MEE (block 420). A MEE coupled to the MEE interface receives the selected message from the MEE interface (block 430).

Figure 5:
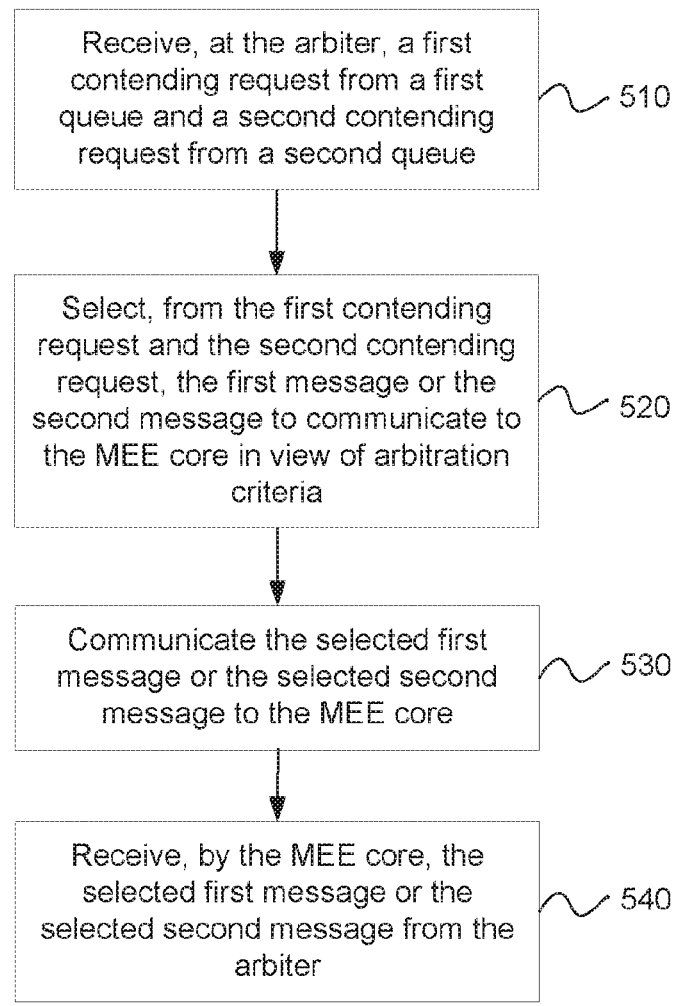
FIG. 5 is a flow diagram of a functionality of system on a chip communicating a message to a MEE according to one embodiment.

FIG. 5 is a flow diagram of a functionality 500 of a system on a chip (SoC) communicating a message to a MEE according to one embodiment. Functionality 500 may be performed by processing logic that may comprise hardware (e.g., circuitry, dedicated logic, programmable logic, microcode, etc.), software (such as instructions running on the processor), firmware or a combination thereof. In one embodiment, the processor 110 of FIG. 1 performs the functionality 500. Alternatively, other components of the computing system 100 of FIG. 1 may perform some or all of the functionality 500. In another embodiment, the processor 600 of FIG. 6A or 6B performs the functionality 500. In another embodiment, the processor 700 of FIG. 7 performs the functionality 500. In another embodiment, the processors 870 and/or 880 of FIG. 8 perform the functionality 500. In another embodiment, the processors 970 and/or 980 of FIG. 9 perform the functionality 500. In another embodiment, the one or more of the cores 1002 of FIG. 10 performs the functionality 500. In another embodiment, the cores 1106 and/or 1107 of FIG. 11 perform the functionality 500. In another embodiment, the processing device 1202 of FIG. 12 performs the functionality 500. Alternatively, other components of the computing systems of FIG. 1 and/or FIGS. 6-12 may perform some or all of the operations of the functionality 500.

Referring to FIG. 5, the functionality 500 begins by an arbiter receiving a first contending request from a first queue and a second contending request from a second queue (block 510). The first contending request is a request to communicate a first message to a MEE of the MEE system and the second contending request is a request to communicate a second message to the MEE. The arbiter selects, from the first contending request and the second contending request, the first message or the second message to communicate to the MEE in view of arbitration criteria (block 520). The arbiter communicates the selected first message or the selected second message to the MEE (block 530). The functionality 500 can further receive, by the MEE, the selected first message or the selected second message from the arbiter (block 540).

FIG. 6A is a block diagram illustrating a micro-architecture for a processor 600 that implements secure memory repartitioning according to one embodiment. Specifically, processor 600 depicts an in-order architecture core and a register renaming logic, out-of-order issue/execution logic to be included in a processor according to at least one embodiment of the disclosure. The embodiments of the page additions and content copying can be implemented in processor 600.

Processor 600 includes a front end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one embodiment, processor 600 may be a multi-core processor or may be part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 660. The decode unit 660 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 660 may be implemented using various different mechanisms. Examples of suitable mechanisms include, but are not limited to, look-up tables, hardware implementations, programmable logic arrays (PLAs), micro-code read only memories (ROMs), etc. The instruction cache unit 634 is further coupled to the memory unit 670. The decode unit 660 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 674 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 6B is a block diagram illustrating an in-order pipeline and a register renaming stage, out-of-order issue/execution pipeline implemented by processor 600 of FIG. 6A according to some embodiments of the disclosure. The solid lined boxes in FIG. 6B illustrate an in-order pipeline, while the dashed lined boxes illustrate a register renaming, out-of-order issue/execution pipeline. In FIG. 6B, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the ordering of stages 602-624 may be different than illustrated and are not limited to the specific ordering shown in FIG. 6B.

Figure 7:
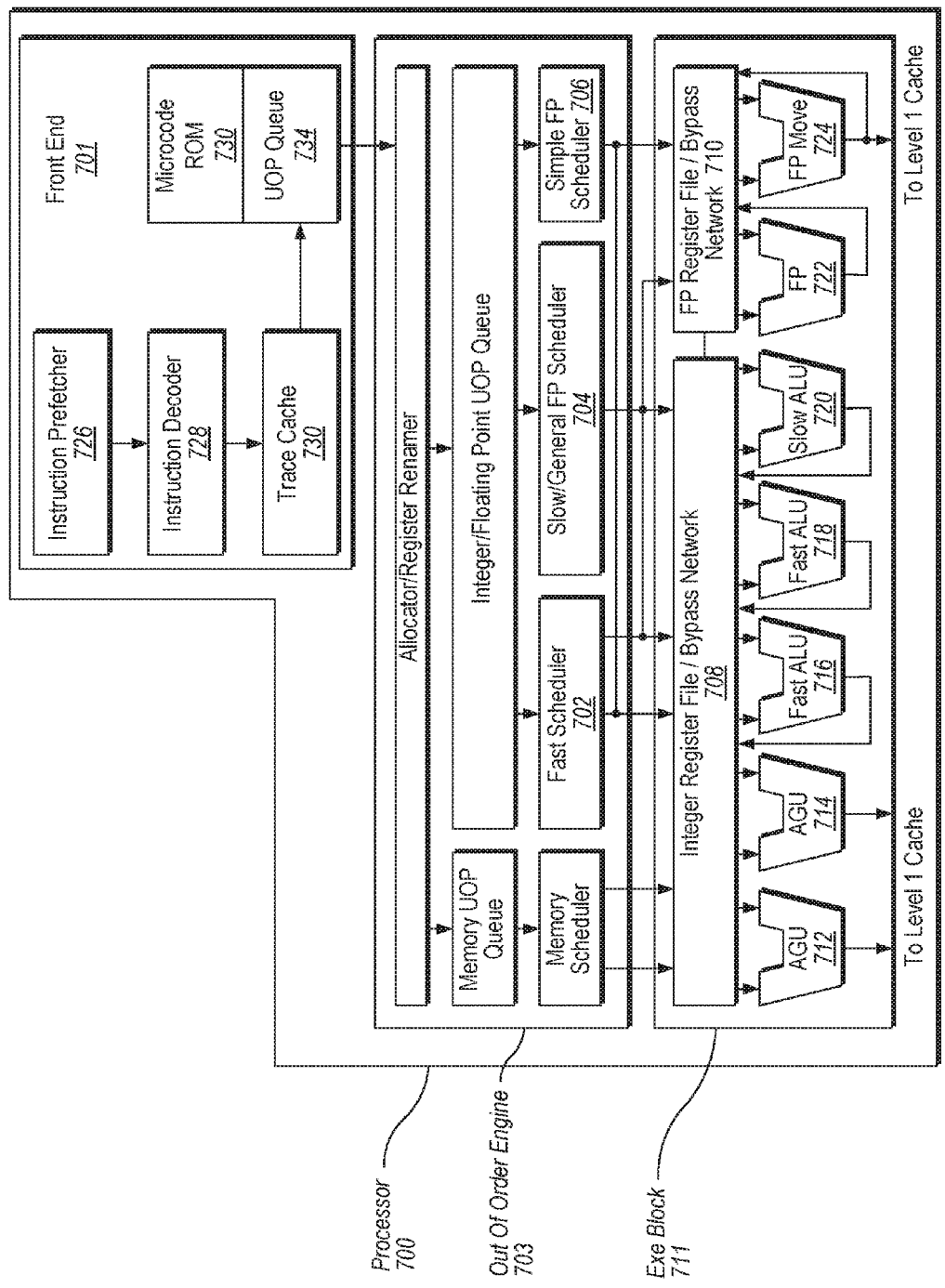
FIG. 7 illustrates a block diagram of the micro-architecture for a processor that includes logic circuits to perform secure memory repartitioning according to one embodiment.

FIG. 7 illustrates a block diagram of the micro-architecture for a processor 700 that includes logic circuits to perform secure memory repartitioning according to one embodiment. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline. The embodiments of the page additions and content copying can be implemented in processor 700.

The front end 701 may include several units. In one embodiment, the instruction prefetcher 716 fetches instructions from memory and feeds them to an instruction decoder 718 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the micro-code ROM 732 provides the uops needed to complete the operation.

Some instructions are converted into a single micro-op, whereas others need several micro-ops to complete the full operation. In one embodiment, if more than four micro-ops are needed to complete an instruction, the decoder 718 accesses the micro-code ROM 732 to do the instruction. For one embodiment, an instruction can be decoded into a small number of micro ops for processing at the instruction decoder 718. In another embodiment, an instruction can be stored within the micro-code ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the micro-code ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register files 708, 710, sit between the schedulers 702, 704, 706, and the execution units 712, 714, 716, 718, 710, 712, 714 in the execution block 711. There is a separate register file 708, 710, for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 710, 712, 714, where the instructions are actually executed. This section includes the register files 708, 710, that store the integer and floating point data operand values that the micro-instructions need to execute. The processor 700 of one embodiment includes a number of execution units: address generation unit (AGU) 712, AGU 714, fast ALU 716, fast ALU 718, slow ALU 710, floating point ALU 712, floating point move unit 714. For one embodiment, the floating point execution blocks 712, 714, execute floating point, MMX, SIMD, and SSE, or other operations. The floating point ALU 712 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 710 as the slow ALU 710 includes integer execution hardware for long latency type of operations, such as a multiplier, shifts, flag logic, and branch processing. Memory load/store operations are executed by the AGUs 712, 714. For one embodiment, the integer ALUs 716, 718, 710, are described in the context of performing integer operations on 64 bit data operands. In alternative embodiments, the ALUs 716, 718, 710, can be implemented to support a variety of data bits including 16, 32, 128, 256, etc. Similarly, the floating point units 712, 714, can be implemented to support a range of operands having bits of various widths. For one embodiment, the floating point units 712, 714, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to implement secure memory repartitioning according to one embodiment. In one embodiment, the execution block 711 of processor 700 may include MCU 115, to perform secure memory repartitioning according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
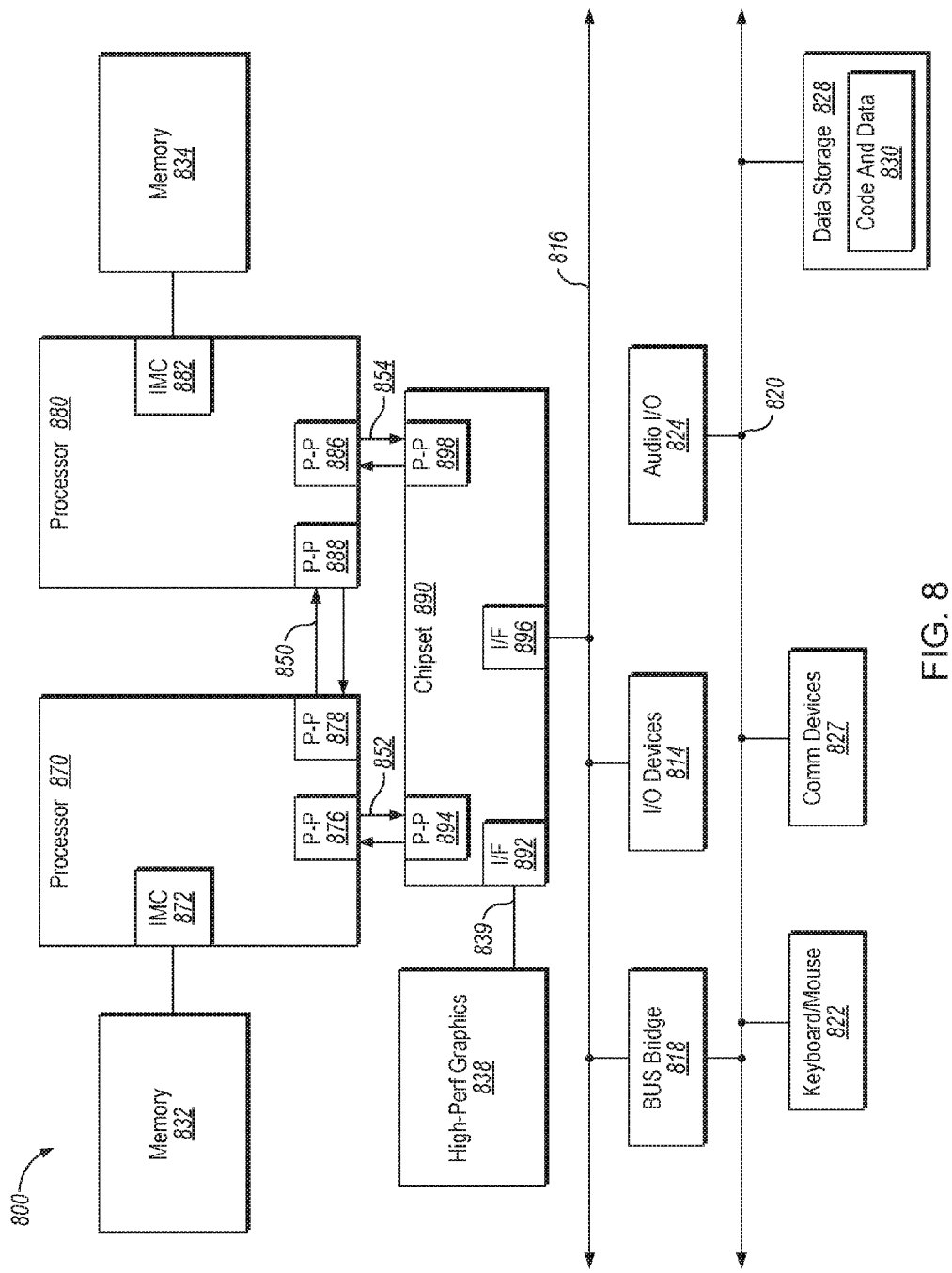
FIG. 8 is a block diagram of a computer system according to one implementation.

Embodiments may be implemented in many different system types. Referring now to FIG. 8, shown is a block diagram of a multiprocessor system 800 in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors. The processors each may include hybrid write mode logics in accordance with an embodiment of the present. The embodiments of the page additions and content copying can be implemented in the processor 870, processor 880, or both.

While shown with two processors 870, 880, it is to be understood that the scope of the present disclosure is not so limited. In other implementations, one or more additional processors may be present in a given processor.

Processors 870 and 880 are shown including integrated memory controller units 882 and 882, respectively. Processor 870 also includes as part of its bus controller units point-to-point (P-P) interfaces 876 and 888; similarly, second processor 880 includes P-P interfaces 886 and 888. Processors 870, 880 may exchange information via a point-to-point (P-P) interface 850 using P-P interface circuits 888, 888. As shown in FIG. 8, IMCs 882 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
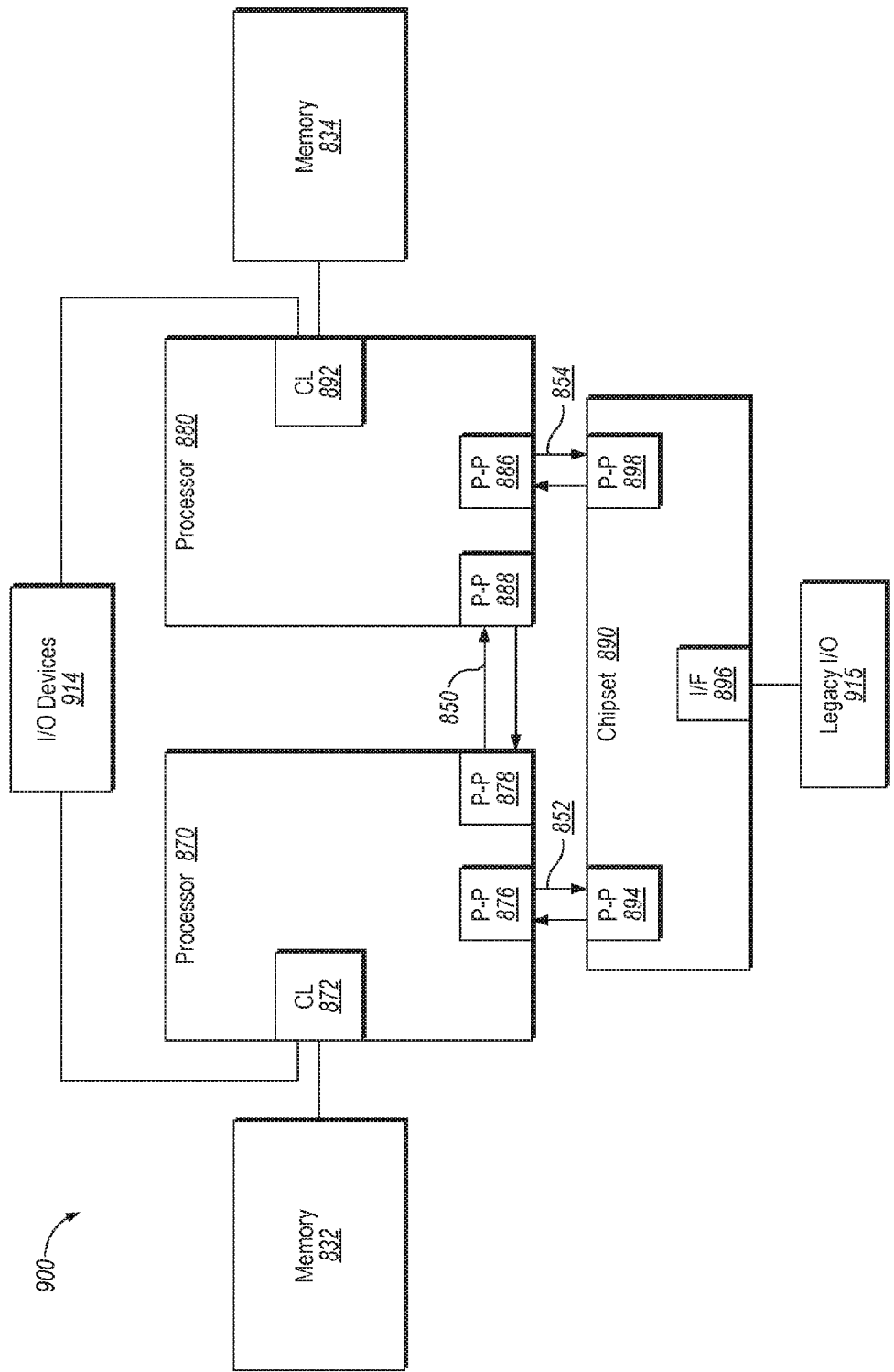
FIG. 9 is a block diagram of a computer system according to another implementation.

Referring now to FIG. 9, shown is a block diagram of a third system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 970, 980 may include integrated memory and I/O control logic ("CL") 972 and 982, respectively. For at least one embodiment, the CL 972, 982 may include integrated memory controller units such as described herein. In addition, CL 972, 982 may also include I/O control logic. FIG. 9 illustrates that the memories 932, 934 are coupled to the CL 972, 982, and that I/O devices 914 are also coupled to the control logic 972, 982. Legacy I/O devices 915 are coupled to the chipset 990. The embodiments of the page additions and content copying can be implemented in processor 970, processor 980, or both.

Figure 10:
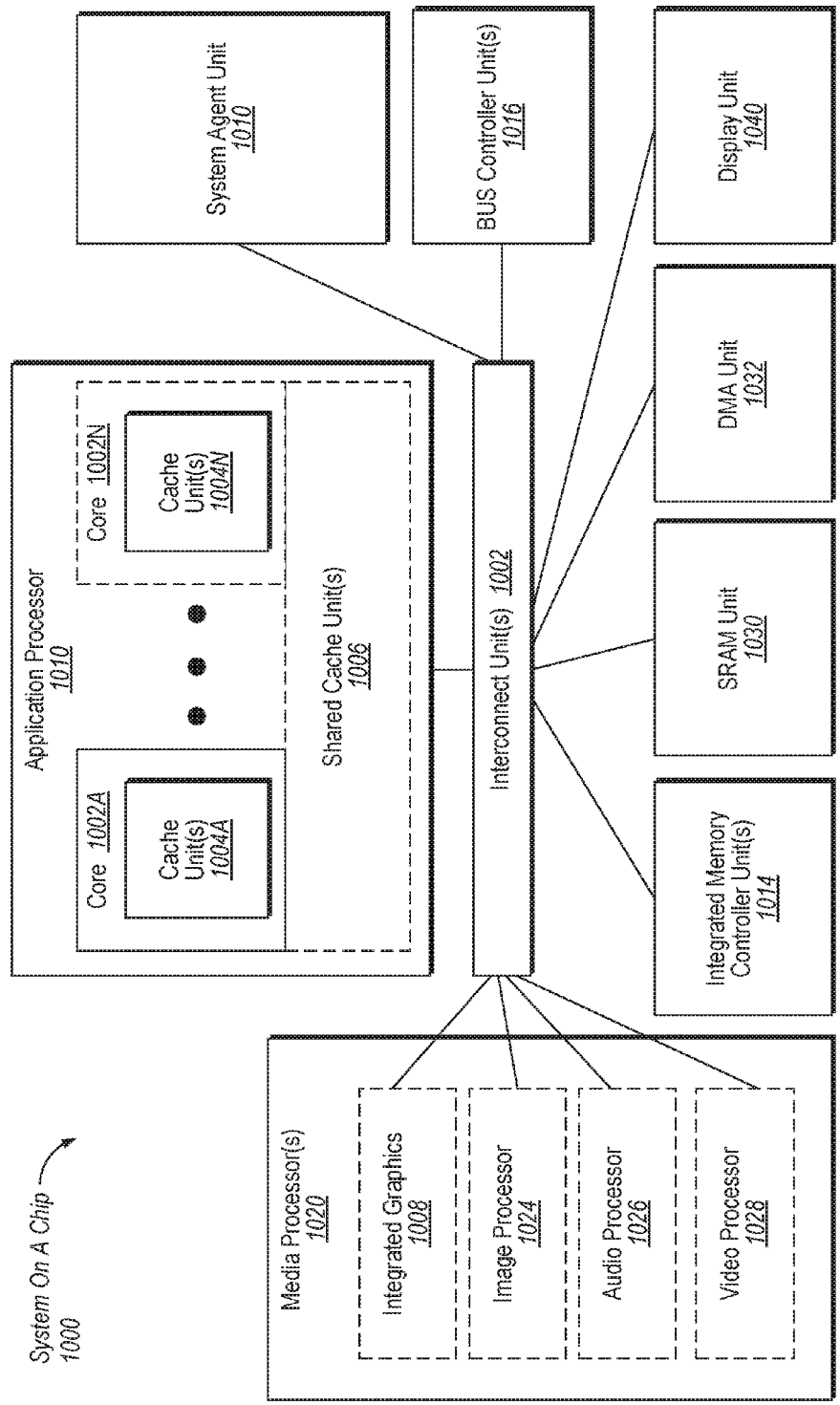
FIG. 10 is a block diagram of a system-on-a-chip according to one implementation.

FIG. 10 is an exemplary system on a chip (SoC) that may include one or more of the cores 1002. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 10, shown is a block diagram of a SoC 1000 in accordance with an embodiment of the present disclosure. Also, dashed lined boxes are features on more advanced SoCs. In FIG. 10, an interconnect unit(s) 1002 is coupled to: an application processor 1010 which includes a set of one or more cores 1002A-N and shared cache unit(s) 1006; a system agent unit 1010; a bus controller unit(s) 1016; an integrated memory controller unit(s) 1014; a set or one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays. The embodiments of the pages additions and content copying can be implemented in SoC 1000.

Figure 11:
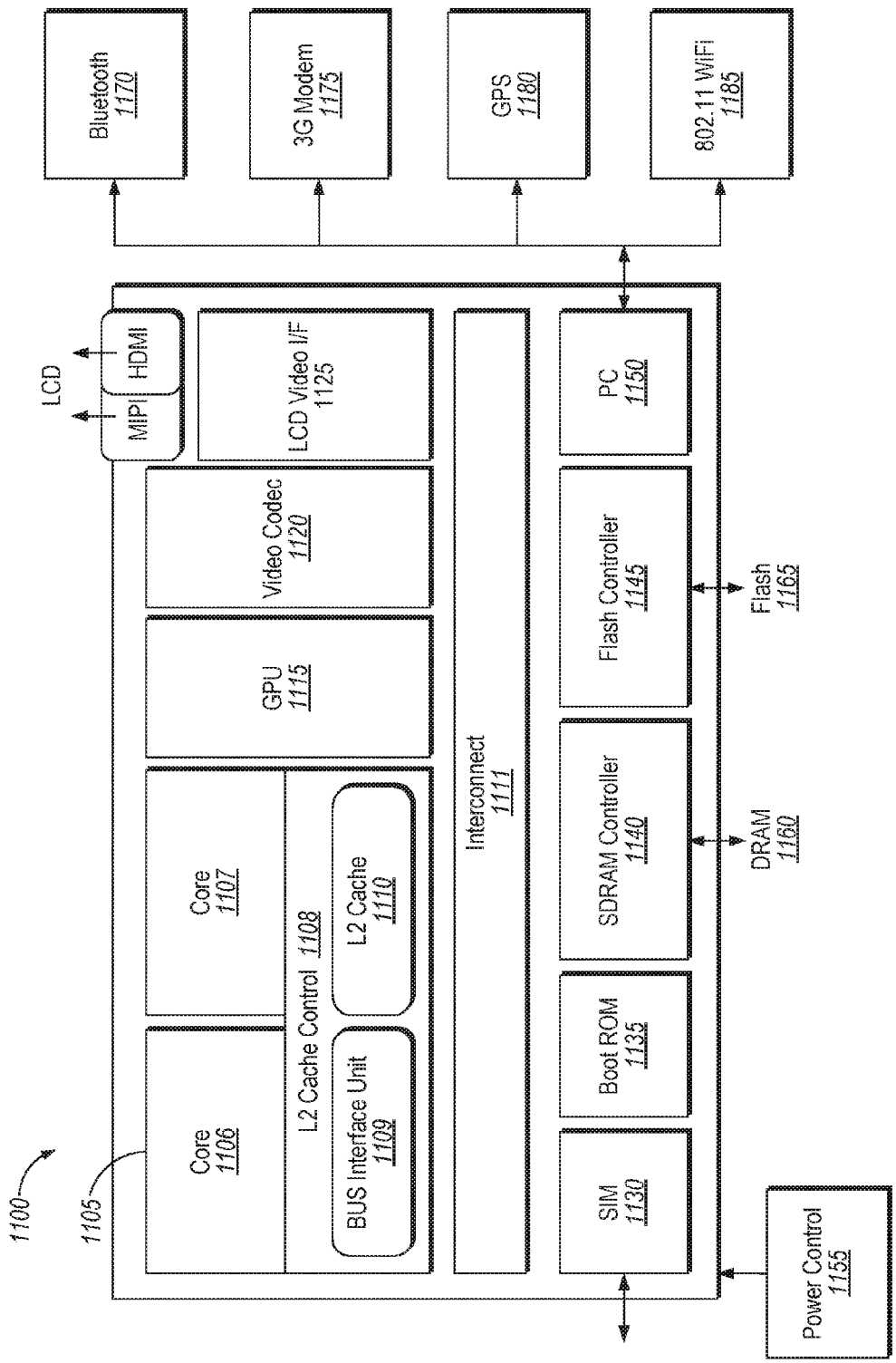
FIG. 11 illustrates another implementation of a block diagram of a computing system.

Turning next to FIG. 11, an embodiment of a system on-chip (SoC) design in accordance with embodiments of the disclosure is depicted. As an illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the page additions and content copying can be implemented in SoC 1100.

Here, SoC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g.

touch enabled input), GPU 1115 to perform graphics related computations, etc. Any of these interfaces may incorporate aspects of the embodiments described herein.

In addition, the system illustrates peripherals for communication, such as a Bluetooth module 1170, 3G modem 1175, GPS 1180, and Wi-Fi 1185. Note as stated above, a UE includes a radio for communication. As a result, these peripheral communication modules may not all be included. However, in a UE some form of a radio for external communication should be included.

Figure 12:
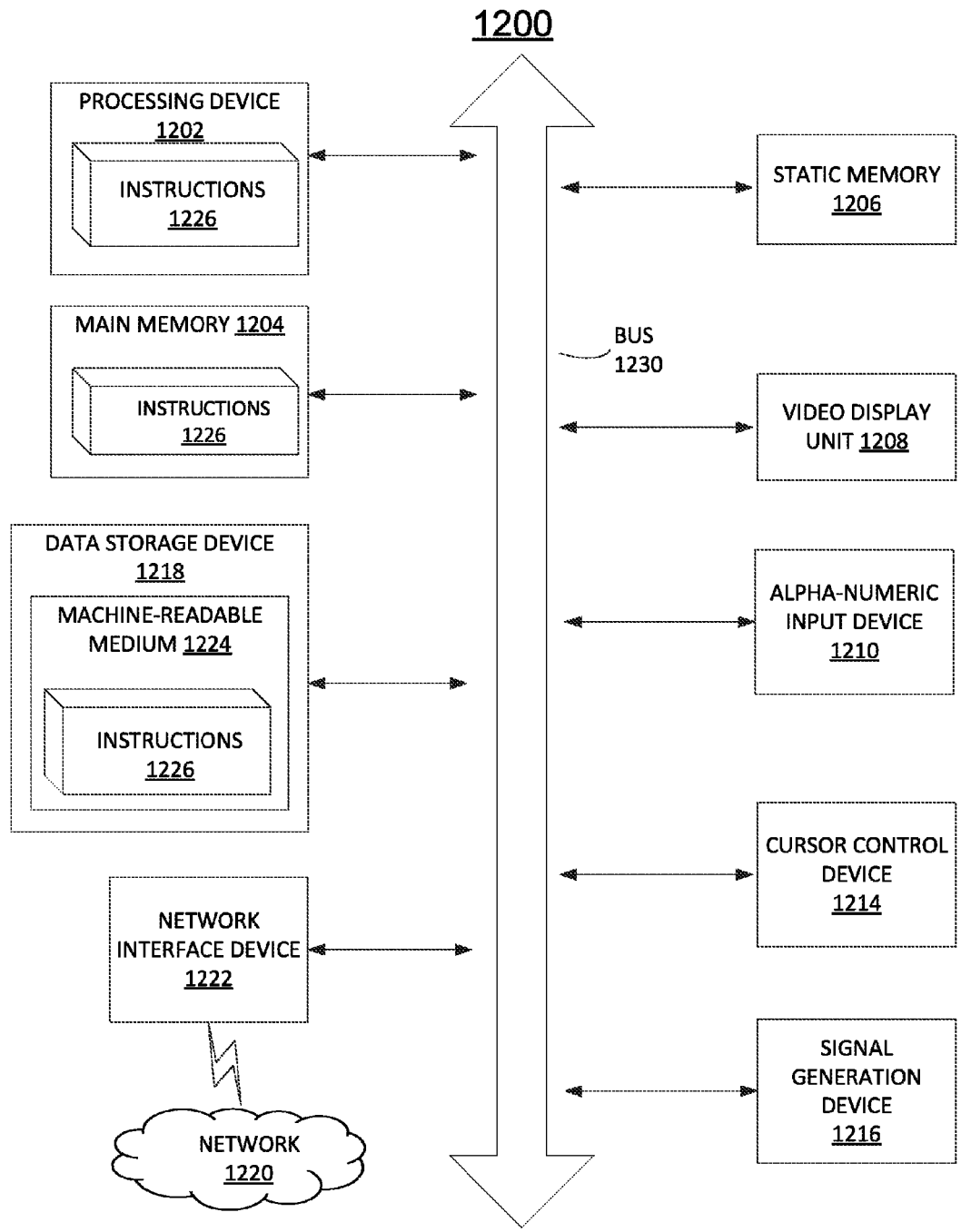
FIG. 12 illustrates another implementation of a block diagram of a computing system.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the page additions and content copying can be implemented in computing system 1200.

The computing system 1200 includes a processing device 1202, main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processor cores. The processing device 1202 is configured to execute the processing logic 1226 for performing the operations discussed herein. In one embodiment, processing device 1202 can be part of the computing system 100 of FIG. 1. Alternatively, the computing system 1200 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1200 may further include a network interface device 1208 communicably coupled to a network 1220. The computing system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a signal generation device 1216 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1224 on which is stored software 1226 embodying any one or more of the methodologies of functions described herein. The software 1226 may also reside, completely or at least partially, within the main memory 1204 as instructions 1226 and/or within the processing device 1202 as processing logic 1226 during execution thereof by the computing system 1200; the main memory 1204 and the processing device 1202 also constituting computer-readable storage media.

The computer-readable storage medium 1224 may also be used to store instructions 1226 utilizing the processing device 1202, such as described with respect to FIG. 1, and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

In Example 1, a processor including: 1) a processor core; and 2) an arbiter of a memory encryption engine (MEE) system, the arbiter coupled to the processor core, where the arbiter can: a) receive a first contending request from a first queue and a second contending request from a second queue, where the first contending request is a first request to communicate a first message to an MEE, and where the second contending request is a second request to communicate a second message to the MEE; b) select, by the arbiter, the first queue to communicate the first message to the MEE or the second queue to communicate the second message to the MEE in view of arbitration criteria; c) communicate, by the arbiter, the selected first message or the selected second message to the MEE In Example 2, the processor of any one of Example 1 where the arbiter can: a) receive at the first queue a first message to be sent to the MEE; and b) receive at the second queue a second message to be sent to the MEE.

In Example 3, the processor of any one of Examples 1-2 where: a) the first message is received from a system agent or a memory controller of a processor via memory links; or b) the second message is received from a system agent or a memory controller of a processor via memory links.

In Example 4, the processor of any one of Examples 1-3 where the arbiter communicates the selected first message or the selected second message to the MEE by forwarding the selected first message or second message from the first queue or the second queue to the MEE.

In Example 5, the processor of any one of Examples 1-4 where the arbitration criteria includes: a) a round robin selection scheme; b) a type of the message for the MEE; or c) a space capacity at a response queue for a response from the MEE.

In Example 6, the processor of any one of Examples 1-5 the first message or the second message can be a request for the MEE or a response to a request from the MEE.

In Example 7, the processor of any one of Examples 1-6 where the arbiter can further communicate the selected first message or the selected second message to the MEE via a MEE interface, where the MEE interface can adjusts a timing of the first message or the second message to match a timing of the MEE.

Various embodiments may have different combinations of the structural features described above. For instance, all optional features of the processors and methods described above may also be implemented with respect to a system described herein and specifics in the examples may be used anywhere in one or more embodiments.

Example 8 is a processor comprising: 1) a processor core; and 2) a memory encryption engine (MEE) coupled to the processor core, where the MEE includes: a) a MEE interface, where the MEE interface can: 1) receive a selected message from an arbiter, where the message is selected by the arbiter from messages at memory link queues; and 2) adjust a timing of the selected message to match a timing of the MEE; b) a MEE, where the MEE can be coupled to the MEE interface and can receive the selected message from the MEE interface.

In Example 9, the processor of Example 8, where: a) the selected message is a first message of a first queue of a first memory link; or b) the selected message is a second message of a second queue of a second memory link.

In Example 10, the processor of any one of Examples 8-9 where the selected message is from a system agent or a memory controller of a processor.

In Example 11, the processor of any one of Examples 8-10 includes a memory controller coupled between the MEE and a main memory, where the main memory comprises an enclave to store secure data.

In Example 12, the processor of any one of Examples 8-11 further includes: a) a system agent to communicate data with at least one of processor core, a graphics core, a cache agent, a system agent, or a memory agent; and b) a memory controller to communicate data with a main memory.

In Example 13, the processor of any one of Examples 8-12 where the MEE interface can receive the selected message from the memory controller or the system agent.

Various embodiments may have different combinations of the structural features described above. For instance, all optional features of the computing system described above may also be implemented with respect to the method or process described herein and specifics in the examples may be used anywhere in one or more embodiments.

In Example 14 a system on a chip (SoC) including: 1) a processor core; and 2) a memory encryption engine (MEE) coupled to the processor core, where the MEE can include: a) an arbiter, where the arbiter is to: 1) receive, at the arbiter, a first contending request from a first queue and a second contending request from a second queue, where the first contending request can be a request to communicate a first message to an MEE of the MEE system and the second contending request is a request to communicate a second message to the MEE 2) select, from the first contending request and the second contending request, the first message or the second message to communicate to the MEE in view of arbitration criteria, and 3) communicate the selected first message or the selected second message to the MEE; and b) the MEE, where the MEE can be coupled to the arbiter and can receive the selected first message or the selected second message from the arbiter.

In Example 15, in the SoC of Example 14 the SoC further including: a) receiving at the first queue the first message to be sent to the MEE; and b) receiving at the second queue the second message to be sent to the MEE.

In Example 16, in the SoC of Examples 14-15 where: a) the first message can be received from a system agent or a memory controller of a processor via memory links; or b) the second message is received from a system agent or a memory controller of a processor via memory links.

In Example 17, in the SoC of Examples 14-16 the SoC further including a MEE interface, where the MEE interface can: a) receive the selected first message or the selected second message from the arbiter; b) adjust a timing of the selected first message or the selected second message in view of a timing of the MEE; and c) communicate the selected first message or the selected second message to the MEE.

In Example 18, in the SoC of Examples 14-17 where the arbiter can: a) select the first message to communicate to the MEE at a first time instance; b) communicate the first message to the MEE at the first time instance; c) select the second message to communicate to the MEE at a second time instance; and d) communicate the second message to the MEE at the second time instance.

In Example 19, in the SoC of Examples 14-18, the SoC further includes a main memory with a protected region, where the MEE can communicate the selected first message or the selected second message to the protected region.

In Example 20, in the SoC of Examples 14-19 the arbitration criteria can be a round robin selection scheme.

In Example 21, in the SoC of Examples 14-20 the SoC further comprising another arbiter, wherein the other arbiter can: a) receive, at the other arbiter, a third message from the MEE; and b) communicate the third message to a memory controller or a system agent While the present invention has been described with respect to a limited number of embodiments, those skilled in the art will appreciate numerous modifications and variations therefrom. It is intended that the appended claims cover all such modifications and variations as fall within the true spirit and scope of this present invention.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present invention.

The embodiments are described with reference to secure memory repartitioning in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, operations of embodiments of the present invention might be performed by specific hardware components that contain fixed-function logic for performing the operations, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a microcontroller, associated with a non-transitory medium to store code adapted to be executed by the microcontroller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
a plurality of memory links;
a processor core; and
a single memory encryption engine (MEE) system coupled to the processor core and the plurality of memory links, the single MEE system to provide inline memory encryption and decryption for each transaction on each of the plurality of memory links, wherein the single MEE system comprises:
an MEE interface coupled to the plurality of memory links; and
an MEE core coupled to the MEE interface, wherein the MEE core is to:
encrypt data associated with each of the transactions sent on one of the plurality of memory links to a memory controller to be stored in a protected region of a main memory;
send the encrypted data on the one of the plurality of memory links to the memory controller;
decrypt data associated with each of the transactions received on one of the plurality of memory links from the memory controller; and
send the decrypted data on one of the plurality of memory links to the processor core; wherein the MEE interface is to adjust a first timing of a first transaction on one of the plurality of memory links to a second timing expected by the MEE core.

2. The processor of claim 1, further comprising the memory controller coupled between the single MEE system and the main memory with the protected region to store encrypted data.

3. The processor of claim 2, wherein first subset of the transactions originates from a system agent and a second subset of the transactions originate from the memory controller.

4. The processor of claim 2, wherein the first transaction is a request to read data from the main memory or a response to the request that includes the data.

5. The processor of claim 1, wherein the MEE interface is to adjust a first timing rate used by one or more of the plurality of memory links to a second timing rate used by the MEE core.

6. The processor of claim 1, wherein the single MEE system further comprises an arbiter coupled to the plurality of memory links, wherein the arbiter is to receive a plurality of transactions on one or more of the plurality of memory links and arbitrate the plurality of transactions in view of arbitration criteria to select a transaction to be processed by the MEE core.

7. The processor of claim 6, wherein the arbitration criteria comprises a round robin selection scheme, a type of the transaction, or a space capacity at a response queue.

8. A system comprising:
a processor comprising:
a plurality of memory links;
a processor core;

a memory encryption engine (MEE) system coupled to the processor core and the plurality of memory links, the single MEE system to provide inline memory encryption and decryption for each transaction on each of the plurality of memory links, wherein the single MEE system comprises:
  an MEE interface coupled to the plurality of memory links; and
  an MEE core coupled to the MEE interface, wherein the MEE core is to:
    encrypt data associated with each of the transactions sent on one of the plurality of memory links to a memory controller to be stored in a protected region of a main memory;
    send the encrypted data on the one of the plurality of memory links to the memory controller;
    decrypt data associated with each of the transactions received on one of the plurality of memory links from the memory controller; and
    send the decrypted data on one of the plurality of memory links to the processor core, wherein the MEE interface is to adjust a first timing of a first transaction on one of the plurality of memory links to a second timing expected by the MEE core; and
the main memory coupled to the processor.

9. The system of claim 8, wherein the processor further comprises the memory controller.

10. The system of claim 8, further comprising the memory controller, wherein the memory controller is coupled between the processor and the main memory, wherein the main memory comprises the protected region to store secure data.

11. The system of claim 8, wherein the first subset of the transactions originates from a system agent and a second subset of the transactions originate from the memory controller.

12. The system of claim 8, wherein the processor further comprises a first system agent to communicate data with at least one of the processor core coupled to the first system agent, a graphics core coupled to the first system agent, a cache agent, a second system agent, or a memory agent.

13. The system of claim 8, wherein the single MEE system further comprises an arbiter coupled to the plurality of memory links, wherein the arbiter is to receive the first transaction from a first queue of a first memory link of the plurality of memory links or from a second queue of a second memory link of the plurality of memory links.

14. A system on a chip (SoC) comprising:
  a plurality of memory links;
  a processor core;
  a graphics core;
  a peripheral unit; and
  a single memory encryption engine (MEE) system coupled to a plurality of memory links, the single MEE system to provide inline memory encryption and decryption for each transaction on each of the plurality of memory links, wherein the single MEE system comprises:
    an MEE interface coupled to the plurality of memory links; and
    an MEE core coupled to the MEE interface, wherein the MEE core is to:
      encrypt data associated with each of the transactions sent on one of the plurality of memory links to a memory controller to be stored in a protected region of a main memory;
      send the encrypted data on the one of the plurality of memory links to the memory controller;
      decrypt data associated with each of the transactions received on one of the plurality of memory links from the memory controller; and
      send the decrypted data on one of the plurality of memory links to one of the processor core, the graphics core, or the peripheral unit, wherein the MEE interface is to adjust a first timing of a first transaction on one of the plurality of memory links to a second timing expected by the MEE core.

15. The SoC of claim 14, wherein the first transaction is a request to read data from the main memory or a response to the request that includes the data.

16. The SoC of claim 14, wherein the single MME system further comprises:
  a first queue to buffer the first transaction to be sent to the MEE core via the MEE interface; and
  a second queue to buffer a second transaction to be sent to the MEE core via the MEE interface.

17. The SoC of claim 16, wherein the single MEE system further comprises an arbiter coupled to the plurality of memory links, wherein the arbiter is to:
  select the first transaction to communicate to the MEE interface at a first time instance; and
  select the second transaction to communicate to the MEE interface at a second time instance.

18. The SoC of claim 17, wherein the arbiter is to select the first transaction and the second transaction in view of arbitration criteria, wherein the arbitration criteria comprises a round robin selection scheme, a type of the data, or a space capacity at a response queue.

19. The SoC of claim 14, the SoC further comprising another arbiter to receive a third message from the MEE interface and communicate the third message to the memory controller or a system agent.

* * * * *